(12) United States Patent
Bane et al.

(10) Patent No.: US 9,619,487 B2
(45) Date of Patent: Apr. 11, 2017

(54) METHOD AND SYSTEM FOR THE NORMALIZATION, FILTERING AND SECURING OF ASSOCIATED METADATA INFORMATION ON FILE OBJECTS DEPOSITED INTO AN OBJECT STORE

(71) Applicant: Cleversafe, Inc., Chicago, IL (US)

(72) Inventors: Adam Bane, Atlanta, GA (US); Robert Minnear, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 13/921,095

(22) Filed: Jun. 18, 2013

(65) Prior Publication Data

US 2014/0040286 A1  Feb. 6, 2014

Related U.S. Application Data

(60) Provisional application No. 61/661,075, filed on Jun. 18, 2012.

(51) Int. Cl.
  *G06F 17/30* (2006.01)
  *G06F 7/24* (2006.01)
(52) U.S. Cl.
  CPC .......... *G06F 17/30253* (2013.01); *G06F 7/24* (2013.01); *G06F 17/3012* (2013.01); *G06F 17/30174* (2013.01); *G06F 17/30265* (2013.01)
(58) Field of Classification Search
  CPC ......... G06F 17/60705; G06F 17/30265; G06F 17/30253; G06F 17/3028

USPC .................................................. 707/754, 756
  See application file for complete search history.

(56) References Cited

U.S. PATENT DOCUMENTS

| 6,549,922 | B1 | 4/2003 | Srivastava et al. |
| 6,708,186 | B1* | 3/2004 | Claborn ............ G06F 17/30607 707/754 |
| 7,343,381 | B2 | 3/2008 | Shin |
| 7,620,633 | B1 | 11/2009 | Parsons et al. |
| 8,224,725 | B2* | 7/2012 | Grim, III ............... G06Q 30/02 705/35 |
| 2004/0039754 | A1* | 2/2004 | Harple, Jr. ................ 707/104.1 |
| 2010/0083173 | A1 | 4/2010 | Germann |
| 2012/0166425 | A1 | 6/2012 | Sharma |
| 2013/0179423 | A1* | 7/2013 | Gur et al. ..................... 707/710 |

OTHER PUBLICATIONS

Foulonnear et al.; "Strategies for reprocessing aggregated metadata", In Research and Advanced Technology for Digital Libraries: 9th European Conference, ECDL 2005 Proceedings, Springer Berlin; 2005, 12 pages.*
Bob Bardwell; "The Power of Cloud Storage"; http://www.rackspace.com/blog/the-power-of-cloud-storage/; Aug. 16, 2012; 6 pages.*
Hutt, Arwen, et al; Balancing the Needs of Producers and Managers of Digital Assets through Extensible Metadata Normalization; Against the Grain, Feb. 2007, pp. 41-43.

* cited by examiner

*Primary Examiner* — Monica Pyo
(74) *Attorney, Agent, or Firm* — Garlick & Markison; Timothy W. Markison (57) ABSTRACT

A system and method to prioritize, filter, and normalize metadata from files being transferred from a file system to an object store repository. The metadata is associated with the file (object) when saved to the object store repository.

7 Claims, 5 Drawing Sheets

METHOD AND SYSTEM FOR THE NORMALIZATION, FILTERING AND SECURING OF ASSOCIATED METADATA INFORMATION ON FILE OBJECTS DEPOSITED INTO AN OBJECT STORE

CLAIM OF PRIORITY

This application claims priority from U.S. Provisional Patent Application No. 61/661,075 filed on Jun. 18, 2012, which is relied upon and incorporated herein in its entirety by reference.

BACKGROUND OF THE INVENTION

Technical Field

This invention relates to file metadata and data storage systems, more specifically the automated creation of metatags associated with objects in an object storage system.

Related Art

There are a variety of generally known data storage systems, including object-based storage systems, commonly referred to as an object stores. Object stores are massively scalable, well beyond traditional file system storage devices in both raw capacity and the number of storable items (objects). Object stores include redundancy and scalability mechanisms that are entirely software based which allows object stores to run on commodity non-specialized hardware with high reliability and consistent performance. Further, object stores allow each object to contain both the data (sequence of bytes representing the object contents) and metadata (set of attributes describing the data), making objects easier to search and locate specific contents than traditional file systems. These properties make object stores highly flexible and desirable platforms for a variety of needs where storage requirements are largely unbounded or unstructured data is collected and may later be accessed for arbitrary purposes.

A large amount of useful metadata is automatically generated and exists within files for numerous content types. For example, standard office documents frequently contain properties such as Title, Subject, Author, Company, etc. and JPEG images contain information on the capturing apparatus and image properties (e.g. JPEGs frequently contain both EXIF and XMP metadata information). There are systems (both proprietary and open-source) for extracting known metadata information from numerous content types. These systems are designed to parse files for known metadata locations and values and output the raw metadata from each file.

Applying metatags (a metadata key paired with a value (key=value or key/value or name/value)) to objects greatly increases the ability to search and use the content in the object store. However, in all but the smallest of cases, manually applying metatag information to each object passed into the storage repository is infeasible. Under most circumstances, a manual process would be prohibitively time consuming and highly susceptible to error.

Since there is no overarching standard for metadata naming conventions, the raw output of metadata extraction from a plurality of content types often contains keys for related information under different key names. For example, one file type may designate an "Author", while another may designate a "Creator" even though the values contain the same information. Similarly, the same file may contain more than one metadata key with the same or similar (and potentially conflicting) values (ex: JPEGs frequently contain 3 different metadata keys to convey the F-Stop with different formatting of the value for each key).

Compounding these problems are restrictions imposed by the object store on the allowable number, value, and size constraints for metatags, which vary between the object store technologies. Therefore, there is a need for methods and systems that can overcome the challenges of associating useful metadata in a normalized fashion to large and varying collections of unstructured data with a plurality of content types as they are deposited into an object store.

SUMMARY OF THE INVENTION

A processing system is disclosed that takes metadata extracted from files being transferred from a file system to an object store and prioritizes, filters, and normalizes the metadata into a collection of metatags that are then associated with the file (object) when saved to the object store repository. The processing system is capable of: receiving raw output from a metadata parser on a file, object, or digital asset; identifying relevant metadata keys and values, in addition to potential user configured metadata (key/values); prioritizing the list of relevant metadata keys; associating the prioritized list of relevant metadata key values to normalized metatag keys; filtering the candidate list of normalized metatag keys and remaining unassociated metadata keys; optionally encrypting the filtered list; and associating the finalized list of metatags with either an encrypted or unencrypted instance of the original file in the object store.

These and other objects and advantages of the invention will become apparent from the following detailed description of the preferred embodiment of the invention. Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

DETAILED DESCRIPTION OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Further, the program environment in which a present embodiment of the invention is executed may incorporate a general-purpose computer or a special purpose device, such as a hardware appliance, virtual server, cloud services compute node, hand-held computer, or coexist within the object storage system. In addition, the techniques of the components described herein can be implemented using a variety of technologies known in the art. For example, the methods may be implemented in software executing on a computer system, or implemented in hardware utilizing either a combination of microprocessors or other specially designed application specific integrated circuits, programmable logic devices, or various combinations thereof. More specifically, the methods may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer readable memory that can direct a computer or other programmable data processing apparatus to function in a particular manner, such that the instructions stored in the computer-readable memory produce an article of manufacture including computer readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
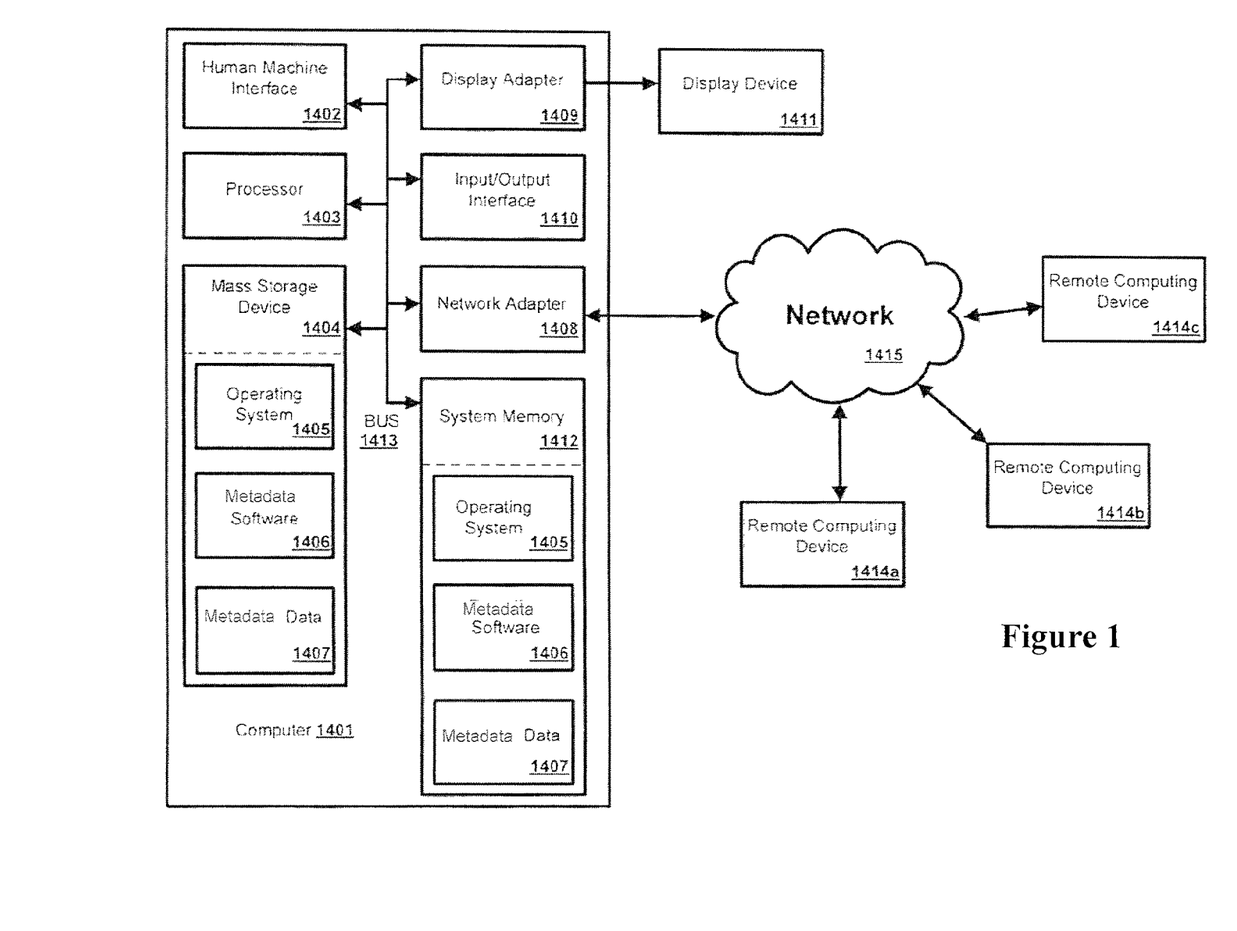
FIG. 1 is a block diagram of a computing device according to an embodiment of the present invention.

FIG. 1 is a block diagram illustrating an exemplary operating environment for performing the disclosed methods according to an embodiment of the present invention. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment. Further, the exemplary operating environment shown in FIG. 1 can be employed by the metadata extraction and normalization system 10, the file system 20, and/or file object repository 30 of FIG. 2.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1401. The components of the computer 1401 can comprise, but are not limited to, one or more processors or processing units 1403, a system memory 1412, and a system bus 1413 that couples various system components including the processor 1403 to the system memory 1412. In the case of multiple processing units 1403, the system can utilize parallel computing.

The system bus 1413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1413, and all buses specified in this description can also be implemented over a wired or wireless network connection and each of the subsystems, including the processor 1403, a mass storage device 1404, an operating system 1405, metadata software 1406, metadata data 1407, a network adapter 1408, system memory 1412, an Input/Output Interface 1410, a display adapter 1409, a display device 1411, and a human machine interface 1402, can be contained within one or more remote computing devices 1414*a,b,c* at physically separate locations, connected through buses of this form, in effect implementing a fully distributed system.

The computer 1401 typically comprises a variety of computer readable media. Exemplary readable media can be any available media that is accessible by the computer 1401 and comprises, for example and not meant to be limiting, both volatile and non-volatile media, removable and non-removable media. The system memory 1412 comprises computer readable media in the form of volatile memory, such as random access memory (RAM), and/or non-volatile memory, such as read only memory (ROM). The system memory 1412 typically contains data such as metadata 1407 and/or program modules such as operating system 1405 and metadata software 1406 (discussed below) that are immediately accessible to and/or are presently operated on by the processing unit 1403.

In another aspect, the computer 1401 can also comprise other removable/non-removable, volatile/non-volatile computer storage media. By way of example, FIG. 1 illustrates a mass storage device 1404, which can provide non-volatile storage of computer code, computer readable instructions, data structures, program modules, and other data for the computer 1401. For example and not meant to be limiting, a mass storage device 1404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1404, including by way of example, an operating system 1405 and metadata software 1406. Each of the operating system 1405 and metadata software 1406 (or some combination thereof) can comprise elements of the metadata software 1406. Metadata 1407 can also be stored on the mass storage device 1404. Metadata 1407 can be stored in any of one or more databases known in the art. Examples of such databases include DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1401 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 1403 via a human machine interface 1402 that is coupled to the system bus 1413, but can be connected by other interface and bus structures, such as a parallel port, game port, an IEEE 1394 Port (also known as a Firewire port), a serial port, or a universal serial bus (USB).

In yet another aspect, a display device 1411 can also be connected to the system bus 1413 via an interface, such as a display adapter 1409. It is contemplated that the computer 1401 can have more than one display adapter 1409 and the computer 1401 can have more than one display device 1411. For example, a display device can be a monitor, an LCD (Liquid Crystal Display), or a projector. In addition to the display device 1411, other output peripheral devices can comprise components such as speakers (not shown) and a printer (not shown) which can be connected to the computer 1401 via Input/Output Interface 1410. Any step and/or result of the methods can be output in any form to an output device. Such output can be any form of visual representation, including, but not limited to, textual, graphical, animation, audio, tactile, and the like.

The computer 1401 can operate in a networked environment using logical connections to one or more remote computing devices 1414*a,b,c*. By way of example, a remote computing device can be a personal computer, a laptop computer, portable computer, a server, a router, a network computer, a peer device or other common network node, and so on. Logical connections between the computer 1401 and a remote computing device 1414*a,b,c* can be made via a local area network (LAN) and a general wide area network (WAN). Such network connections can be through a network adapter 1408. A network adapter 1408 can be implemented in both wired and wireless environments. Such networking environments are conventional and commonplace in offices, enterprise-wide computer networks, intranets, and the Internet 1415.

For purposes of illustration, application programs and other executable program components such as the operating system 1405 are illustrated herein as discrete blocks, although it is recognized that such programs and components reside at various times in different storage components of the computing device 1401, and are executed by the data processor(s) of the computer. An implementation of metadata software 1406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 2:
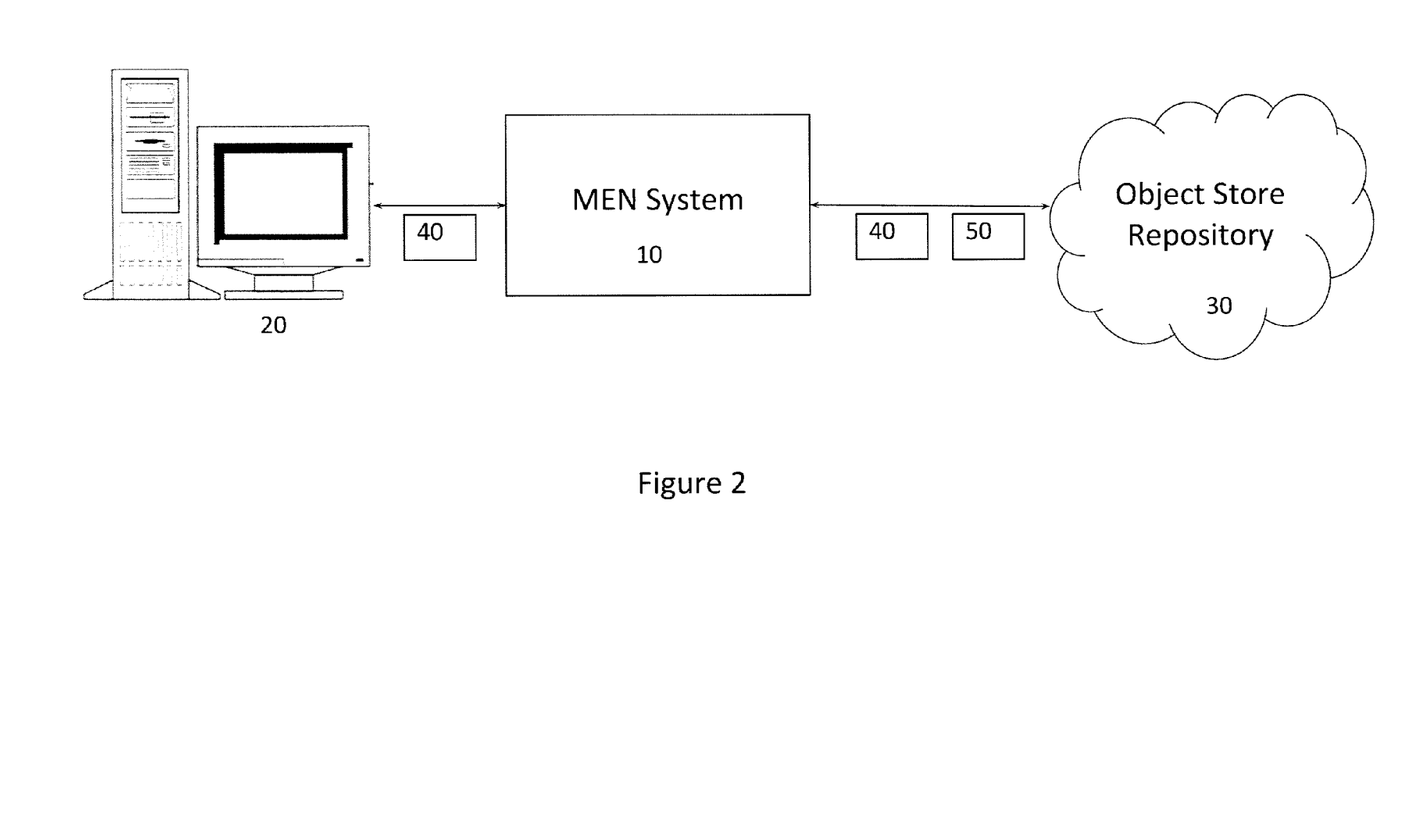
FIG. 2 is a schematic representation of a metadata extraction and normalization system according to an embodiment of the present invention.
Figure 3:
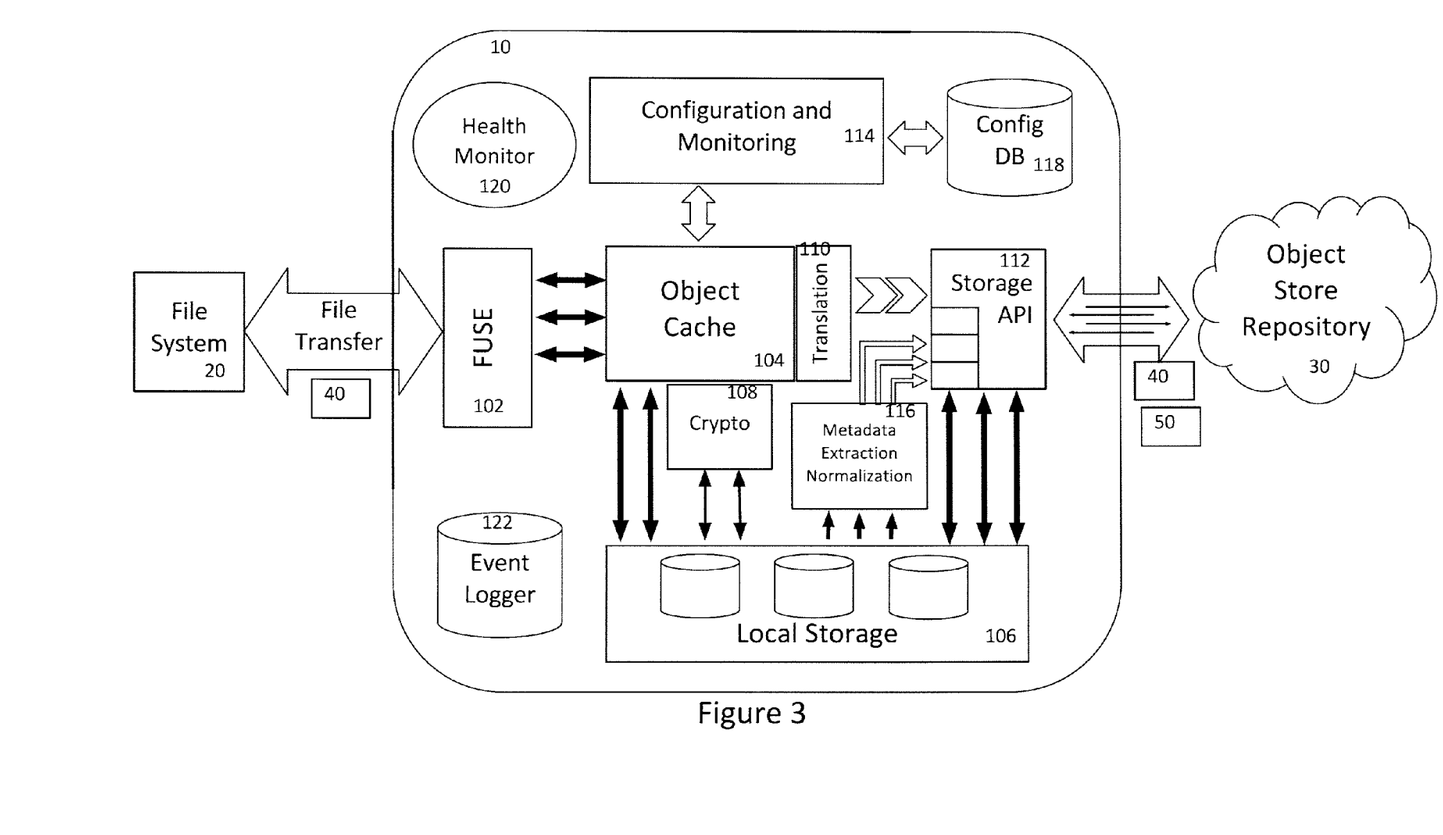
FIG. 3 is a block diagram of the metadata extraction and normalization system of FIG. 2 according to an embodiment of the present invention.

An embodiment of the present invention, as illustrated in FIGS. 1-3, provides a metadata extraction and normalization (MEN) system 10 to extract, prioritize, normalize and associate file metadata from files 40 found on a traditional file system 20 as metatags 50 in an object store repository 30.

In some embodiments, the system 10 may reside on any modern computing device such as a general-purpose server computer, as discussed above and shown in FIG. 1. For example, a CPU (e.g., 1401 of FIG. 1) for the MEN system 10 may be a recent model such as an Intel Xeon E7 or equivalent. In an embodiment of the present invention, multicore or parallel processors may be utilized to improve code execution time of the MEN system 10. In an aspect, memory (e.g., 1412 of FIG. 1) should be sufficient to load and hold the system data structures from the file system 20. For example, in such an aspect, the memory 1412 can be generally configured in excess of 2 GB of RAM in the current embodiment. Persistent storage 1404 (such as local hard disk, NAS or block devices accessible by the metadata extraction and normalization system 10) should be sufficient to hold files 40 from the file system 10 while being processed. In an embodiment, persistent storage 1404 in excess of 50 GB can be used. Other embodiments of the MEN system 10 may incorporate other processors (e.g., 1403 in FIG. 1 or low power CPUs commonly used on mobile devices), lower or higher amounts of system memory 1412 or less (or more) persistent storage space 1404.

The files 40 can come from a number of file systems 20 on a number of devices. For example, the files 40 can be transferred from a common general purpose computer or data storage system 20, or from a specific device, including, but not limited to, a digital camera, mobile phones, tablets digital audio recorders, and/or the like.

The object store repository 30 can be any of a collection of object storage platforms such as OpenStack Object Storage, EMC Atmos, Amazon S3, Amplidata AmpliStor, Caringo CASTor, Ceph, Nirvanix, Microsoft Azure Blob Storage, and Scality Ring, and the like. The object store repository may be centrally located or distributed remotely, including between multiple geographic regions. In either case, the multiple servers can be accessed via a uniform API.

As illustrated in FIGS. 2-3, the MEN system 10 receives a file 40 from a file system 20 that is sent to the object repository 30. The MEN system 10, illustrated in FIG. 3, accepts a file transfer request and the corresponding file 40 from the originating file system/device 20. In an aspect, the MEN system 10 can accept files 40 transferred over SMB or NFS protocols. In other aspects, the MEN system 10 can use other file transfer methods such as FTP, WebDAV, HTTP, HTTPS or SCP. Transfers of files 40 can occur over various networks (e.g., 1415 of FIG. 1) and can occur on any number of common computer network technologies such as Ethernet, fiber channel, or wireless systems.

In another aspect, the various applications of the MEN system 10 discussed in more detail below can run against an existing file system 20 without requiring the file 40 to be initially copied to the MEN system 10. In another aspect, the various applications of the MEN system 10 can run against an existing object store different from the destination object store 30. The file 40 can be transferred to a file system in user space system (FUSE) file system 102. The FUSE file system 102 can register the file 40 in an object cache 104. The MEN system 10 can assign a permanent identifier to locate the file 40, given that files 40 saved in the object cache 104 are transient by nature. The FUSE file system 102 can also store the file to persistent storage 106. In an aspect, as discussed above, the persistent storage 106 can include, but is not limited to, a local storage device, ephemeral storage, memory storage, and the like. In another aspect, of the MEN system 10 can use another user programmable file system or a kernel module file system. In another embodiment, the MEN system 10 can include a crypto system 108 that can encrypt a file 40 when passed to the object store repository 30 and will create an encrypted copy of the file 40. Any number of encryption ciphers known in the art may be employed to encrypt the file.

Once the file 40 has been transferred from the file system 20 to the MEN system 10 and registered with the object cache 106, a translation application/layer 110 can queue and issue calls to the object store repository 106 to transfer the files 40 either to or from the MEN system 10 based on the transfer request using an object storage application programming interface (API) 112.

A configuration and monitoring application 114 can issue configuration options to the object cache 104. In an aspect, the configuration and monitoring application 114 can provide for a number of configuration options. In an aspect, the configuration options of the configuration and monitoring application 114 can include enabling and defining the encryption application/layer 110 and enabling and defining the metadata extraction and normalization application 116, discussed below. The configuration and monitoring application 114 can also define how objects/files 40 should be manipulated and persistently stored in the object cache 104, the persistent storage 106, as well as the object store repository 30. The configurations can be user-defined and stored in a configuration database 118. For example, the user can configure settings including, but not limited to, which object store API to use, which object store location to use, how metadata is extracted, what metadata is extracted, and how the extracted metadata will be tagged in the object store repository 30.

In an aspect, the MEN system 10 can be monitored by a health monitor application 120. The health monitor application 120 is responsible for ensuring processes are running and properly operational. The primary function of the health monitor application 120 is to monitor processes that the MEN system 10 launches and detect if the processes launched are executed and carried out. Depending on configuration settings, the health monitor application 120 can restart an exited process, collect system information at the time of the exit and package this information into a bundle of files that can be analyzed. The health monitor application 120 can also dispatch log messages that may be observed by operators/users located in an event logger application 122. The event logger application 122 can take log messages for a variety of processes running on the MEN system 10 and log the messages both to a user interface (Web UI or CLI) and to the local persistent storage 106. The event logger application 122 can also ensure that log messages do not overrun the allocated disk space for the logs.

Figure 4:
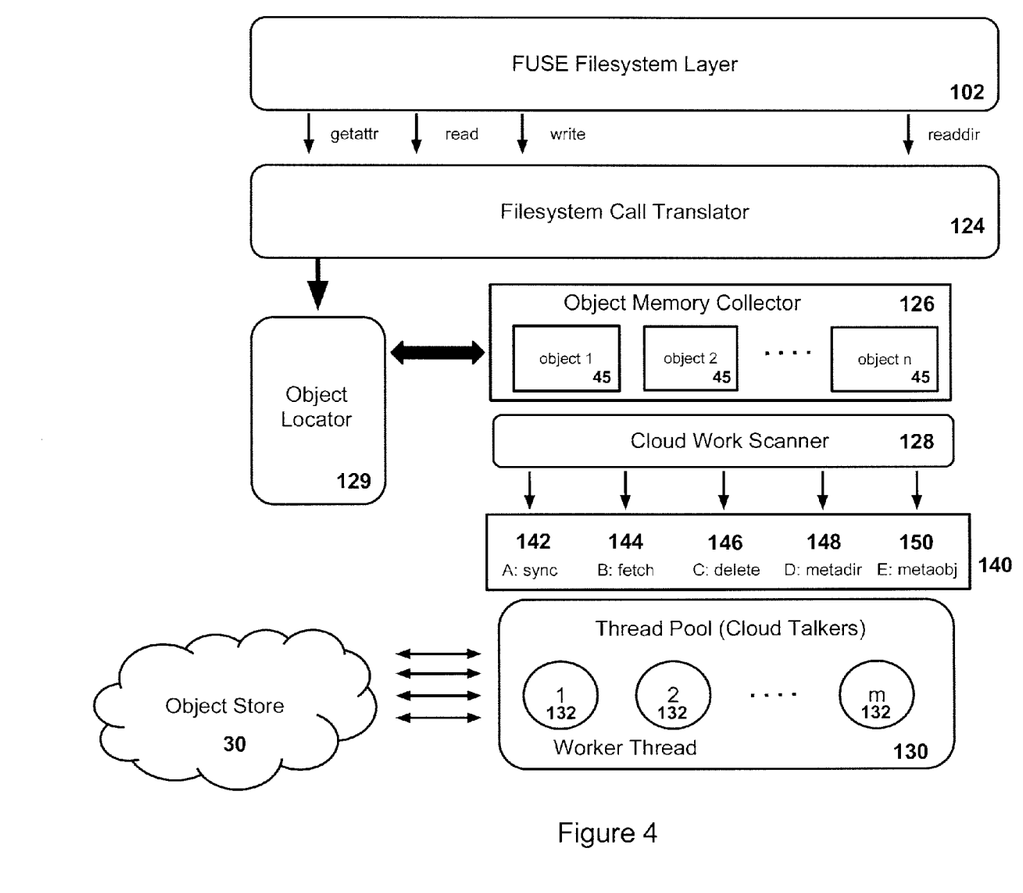
FIG. 4 is a block diagram of the metadata extraction and normalization system of FIG. 2 according to an embodiment of the present invention.

In an aspect, as shown in FIG. 4, the MEN system 10 can utilize the FUSE file system 102 to work with a file system call translator 124, a collection of memory objects 126, a cloud work scanner 128, a queue discipline module 140, a thread pool module (cloud talkers) 130, an object locator 129, and the object store repository 30, all described in more detail below.

In an embodiment, the FUSE file system 102 provides a file system interface where files/objects 40 may be copied onto or off of the MEN system 10. The file system call translator 124 is a subsystem that ensures the desired call semantics of the FUSE file system 102 are executed as intended. The FUSE file system 102 utilizes the file system call translator 124 to call the appropriate functional call on the object 40. The file system call translator 124 is activated to apply a function on an object once the object locator 129 confirms that the object/file 40 exists, with the object locator 129 looking towards the object cache 104, persistent storage 106, and/or the collection 126.

The memory object collection 126 includes a local representation 45 of a file 40 (which can be stored on the object cache 104 and/or persistent storage 106) for certain operations to enhance read, getattr, readdir, and/or write performance by having localized versions of the data of the files/objects 40 to be stored in the object store repository 30. The reads and writes executed by the file system call translator 124 can be done on the local versions 45 of the file/object 40 (found in the object collection 126) to optimize the read and write performance. In an aspect, the optimization occurs by working on local file/object versions 45 asynchronously from objects being transferred to the object store repository 30, which avoids object store interaction time. The MEN system 10, via the cloud work scanner 128, ensures that modifications made to the files/objects 40 stored in the memory object collection 126 are later synchronized with the file/objects 40 transferred and stored on the object store repository 30.

The cloud work scanner 128 scans the objects/files 40 of the memory object collection 126 to look for modified objects 40 to determine what cloud operation is required, which will be carried out by the API associated with the object store repository 30. Cloud operations, carried out by the object store API, include loading an object 40 to the object store repository 30 by copying the contents of the local file 45 (which can be found on the object cache 104 or object collection 126), updating object metatags 50, deleting objects 40, modified and unmodified, from the object store repository 30, and downloading object data from the object store repository 30.

In an aspect, the cloud work scanner 128 can also work with the discipline module 140 to transfer the objects 40 and metatags 50 to the object store repository 30. The discipline module 140 can define the operations carried out by the MEN system 10. Various disciplines (142, 144, 146, 148, 150, discussed below) can control the operations performed by the thread pool (could talkers) 130 on the objects 40 that are stored on the object store repository 30.

In an aspect, the discipline module 140 includes various disciplines. The disciplines can include, but are not limited to, a sync discipline 142, a fetch discipline 144, a delete discipline 146, a meta directory discipline 148, and a meta object discipline 150. The sync discipline 142 can be used to copy files from the local system 10 to the object store repository 30 and verify the transfer. The fetch discipline 144 can be used to retrieve files 40 from the object store repository 30 to the local system 10 and verify the transfer. In an aspect, the verification for the sync discipline 142 and fetch discipline 144 can be performed by comparing a hash signature of the object data carried out by the MEN system 10 against the hash signature carried out by object store repository 30. The delete discipline 146 can delete files 40 from the object store repository 30. The meta directory discipline 148 can create an object 40 of information in a directory on the object store repository 30. The object/file 40 created by the meta directory discipline 148 can represent a directory of objects 40 that can have metadata for each object 40 on the object store repository 30, or the created object 40 can contain similar metadata that is stored in the original object 40. The meta object discipline 150 can create additional information for a single object 40 that is be stored on the object store repository 30. For example, the additional information can include ownership and group permissions. In other embodiments, these and other disciplines known in the art can be used to facilitate the transfer of files to object store repositories.

The disciplines 140 can define the operations performed by the thread pool (cloud talkers) 130. The cloud talkers 130, based on the message/commands received, will perform the requested unit of work as it pertains to interfacing with the object store. The cloud talkers 130 can perform units of work required by the MEN system 10. The cloud talkers/threads 130 can perform (be executed) in parallel with one another.

A file 40 that has locally modified data (i.e., found on the memory object collection 126 on the object cache 104) will, for example, issue a sync message/discipline 142 to ensure the modified data is written to the cloud/object store repository 30. The sync discipline 142 will bring the file 40 in sync with the local object 45 found in the object memory collection 126. The various disciplines of the discipline module 140 *s* are configured so that the thread pools/cloud talkers 130 can call on any discipline to operate on any object 40.

The thread pools/cloud talkers 130 can interface with a multitude of cloud APIs by calling upon the storage API 112 establishing a communication path to the object store repository 30, hence the name cloud talkers. Each thread (1, 2, . . . m) can accept workloads on a single object 40 and/or local object 45, whether stored on the object cache 106, directly from the file system 20, or the persistent storage 106, of any discipline. Each thread 130 constantly awaits a workload message/discipline 140 from the cloud work scanner 128. A thread 130 can do a unit of work defined by the various disciplines 142, 144, 146, 148, 150, as defined by the discipline module 140. A thread 130 continually waits for disciplines 140 (e.g., sync 142) to be available and reads off a single message/discipline available to all worker threads 130. Language locking semantics ensure that a message/discipline 140 is delivered to exactly one thread 130. For example, the queue functionality available in Python ver. 2.7 provides this type of message synchronization. When the worker thread 132 reads the message, it contains the unit of work as determined/requested by the discipline module 140 and the object 45 from the memory object collection 126 on which to operate. The worker thread 132 proceeds until completion of the unit of work and removes the message from the queue to ensure no other thread will attempt the same.

For example, a pool thread/cloud talker 130 is assigned a sync workload/discipline 142. The pool thread 130 begins by taking a snapshot of the local representation of the file 45 found in the memory object collection 126. After this snapshot, the MEN system 10 clears the modified object 45 to reset the condition of the object 40 to its unmodified state.

The object locator 129 is responsible for finding a localized object 45 or stored on the object store repository 30. The FUSE file system 102 calls or generally references a file 40 on the file system 20 by a path. A path is a unique location within a single file system 20 that describes either a directory of files 40 or an individual file 40. The FUSE file system 102 maps these file system objects 40 to in-memory representations 45 by performing a lookup of the path and returning an object 45 (potentially creating it). The object 45 is identified to the FUSE file system 102 by calculating a persistent identifier, which is performed by the object locator 129.

Prior to initiating communication with the object store repository 30, a complete description of the work required to sync the object data 45 is persisted to the persistent storage 106 on the MEN system 10. If operations are interrupted, the complete work description stored on the persistent storage 106 can be used to restart the exact same transaction. In fact, the originating sync discipline 142 is initiated from this set of saved instructions, which can also be stored on the persistent storage 106. Prior to commencement of the transaction, the locally modified object 45 found in the object memory collection 126 is checked. If modifications are indicated, the current sync operation/discipline 142 is aborted and the cloud work scanner 130 will reschedule the new sync 142.

In an aspect, the MEN system 10, through the use of the metadata extraction and normalization application 116, has the ability to normalize metatags across all content types of files 40 from any file system 10 by mapping extracted metadata keys to a common metatag key that is used in the object store repository 30. The mapping capability is provided per content type to give fine grain control over the keys used. To accommodate redundant or conflicting metadata information, the MEN system 10 allows a user to specify a list of extracted metadata keys in prioritized order to map to the metatag key. Metadata values from the highest priority key are used as the value assigned to the metatag key.

Figure 5:
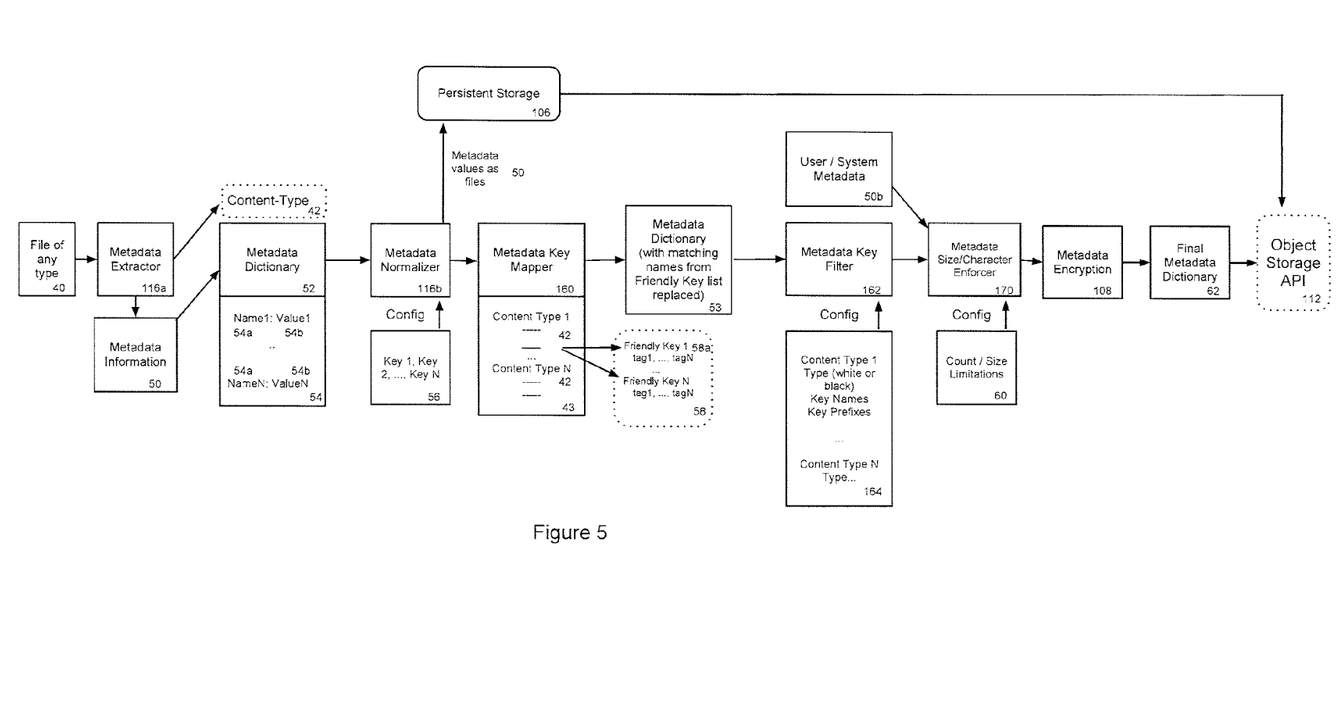
FIG. 5 is a block diagram of a method performed by the metadata extraction and normalization system according to an embodiment of the present invention.

In an aspect, as illustrated in FIG. 5, the metadata extraction and normalization (MEN) application 116 is utilized to extract and normalize the metadata contained in the files 40 to create metatags 50 for the object store repository 30. The MEN application 116 can include a metadata extractor module 116a and a metadata normalization module 116b.

When the MEN application 116 is enabled, files 40 from the file system 20 that are passed through the MEN system 10 are sent to a metadata extractor module 116a of the MEN application 116 that pulls metadata information 50 from the files 40. In an aspect, the MEN application 116, and more specifically the metadata extractor module 116a, is able to identify the file type 42 of the file 40 in order to extract the metadata 50. In an aspect, the extractor 116a will determine the file type 42 by the extension of the file 40 or by looking for a known sequence of bytes that start the file content types (e.g., magic numbers). The metadata extractor module 116a accepts a plurality of file types 42 and outputs metadata information 50 that is embedded in the file 40. In an aspect, embodiments the metadata extractor module 116a can be commonly available metadata extraction tools such as, but not limited to, Tika (Open source Apache project) and the like.

In other embodiments, the MEN system 10, via the MEN application 116 and metadata extractor module 116a, may accept external sources of metadata information 50 to associate with the file 40. Examples of external metadata sources 50 include database repositories, content management systems and object storage devices among other systems. Examples of metadata 50 include, but are not limited to, Author, Last-Author, Title, and document statistics from Office document types; Artist, Album, Genre from Audio files; and F-Stop, Exposure, Flash from Images.

The metadata extraction module 116a takes as input a file 40 of any content type 42 and outputs extracted metadata 50 (either extracted by the metadata extraction module 116a or supplied by external sources) in a dictionary form 52. The metadata dictionary 52 can be a collection of pairs 54 of key names 54a and matching values 54b. The metadata dictionary 52 allows for a name found in the extracted metadata 50 to be looked up to see if a key 54a of the same name exists. Using the matching of the name of the metadata 50 to the key 54a, a value 54b associated with the found key 54a can be changed. In addition, the MEN application 116 can create new and delete key value pairs 54.

In an aspect, the metadata dictionary 52 can employ a JSON (JavaScript Object Notation) format, comprising a collection of name/value pairs 52 (as indicated by the Name1:Value1). The metadata dictionary 52 can be modified and updated by the MEN system 10 throughout the synch process, as described above. Additional embodiments may use other structured formats for the metadata dictionary 52, including, but not limited to, XML, Python dictionaries, python ordered collections, or a database. The metadata extraction module 116a may determine the content-type 42 of the input file 40. In an embodiment, the thread pool 130 can be configured to provide the content-type 42 of the file 40. As discussed above, the content-type 42 of the file 40 can be used by a metadata key mapping module 160 to find a certain configuration state, corresponding to a configuration file 43.

The metadata key mapping module 160 provides a user the ability to create a user defined key name/friendly name 58a that can be consistently applied across a plurality of content types 42 for specific information and associate the values 54b from specific automatically extracted keys 54 to the user defined key name/friendly name 58a. Additionally, the metadata key mapping module 160 allows a user to specify a hierarchy of extracted key values to a user-defined key name. This enables the user to create rules to resolve conflicts in metadata values within specific content types.

For example of operation of the metadata key mapping module 160, a user may start by identifying the metadata keys 54 that are contained in the selected content-types 42. After assembling the list of metadata keys 54 for content-types 42, the user may identify if there are keys 54 in different content types 42 that expose the same information 54b, but use different names 54a (Author and Creator are commonly used interchangeably between different content types). If so, the user can then determine the key name to use 58a (friendly key name) for organizing metadata keys and determine which extracted key names should be associated with the friendly key name 58a.

Utilizing the metadata key mapping module 160, the user can then determine if there are extracted keys within the same content type 42 that provides similar information, as shown in the configuration file 43 (created and configured by the configuration and monitoring application 114 from input provided by the user) and its friendly key list 58. The configuration file 43 represents the rules to map extracted metadata keys to friendly key names 58a and prioritize extracted keys that contain redundant information. For example, JPEG image contain "Aperture Value", "F-Number", and "exif:FNumber" with the same information (different formatting). The user is then to use the mapping configuration to prioritize which value is used when creating the metadata tag in the storage repository.

For example, the user can set up the list as the following:
Content-type 1:
Friendly Name 1=Key 1, Key 2, . . . , Key N (where Key # is the prioritized list of potential key values to associate with the Friendly Name Key with 1 being the highest priority)
Friendly Name 2=Key 1, . . .
Content-type 2:
Friendly Name 1 . . .

After the user has created the mapping list (comprised of the configuration file 43 and friendly key list 58), the user may either enter the list directly into the MEN system 10 through CLI commands or create a specially formatted file to import a large list of mapping rules at one time. In some embodiments of the system, the user can use a web interface to set up and import the mapping list. In an aspect, the user can call upon the configuration and monitoring application 114 to create the configuration file 43 and friendly key list 58, which can be stored in the configuration database 118.

In an aspect, the metadata key mapping module 160 is configured to scan metatags 54 of the files 40 and replace the first encountered tag/metadata 54 with a configured user defined name (or friendly key) 58a, contained within the configured metadata mappings 58 with the value 54b of the matched tag 54. In other words, the name 54a of the original metadata pairs 54 is replaced by the friendly key 58a. The content-type 42 of the file 40 (either determined by the metadata extractor 116a or passed in by the cloud talker 130) is used to determine what (if any) configured friendly key list 58 should be employed. For each content-type 42, the MEN system 10 allows for a user defined name (friendly key) 58a to be used in place of the key name 54a from the extracted or externally defined metadata information 50. The key value 54b will then be matched with the friendly key 58a.

In an aspect, with each friendly key name 58a, the MEN system 10 maintains a user defined, priority ordered list 58 of the friendly key names 58a to replace the metadata key names 54a. The metadata key mapping module 160 discards (and removes from the dictionary 52) any subsequent keys 54 (names 54a and values 54b) encountered in the remaining key list 58 of lower priority during the scan. If a higher priority key name 54a is found that matches a friendly key name 58a, the metadata key mapping module 160 shall update the friendly key value 58b with the metadata key value 54b of higher priority. The metadata key mapping module 160 is capable of discarding other tags specified in the list 58 if a match is made. More specifically, the metadata key mapping module 160 considers each key name 58a in the ordered list 58. If the metadata key mapping module 160 fails to make a match to friendly keys 58a being used (that is there is no corresponding friendly key 58a matching a key name 54a), any of the remaining key names 54a encountered are deleted along with their values 54b. Once completed mapping, the metadata key mapping module 160 will then modify the metadata dictionary 52 to a normalized or modified metadata dictionary 53 that is used as input for later modules in the pipeline.

After the metadata key mapping module 160 completes its mapping, the normalized/modified metadata dictionary 53 now contains condensed metatags from the friendly key name replacement (and discard). This condensed/normalized/modified dictionary 53 is now input to a metadata key filter module 162.

The metadata key filter module 162 takes the modified/condensed dictionary 53, the configuration file 43 and key friendly list 58. The metadata key filter module 162 is configured by a filter configuration file 164. The filter configuration file 164 contains a user defined list of metadata key names that should be included (whitelisted) and/or excluded (blacklisted) of each content type 42 identified by the user to be included in the object store repository 30. If the metadata information 50 in the modified/condensed dictionary 53 contains a content-type 42 that matches a content type 42 found in the filter configuration file 164, the metadata key filter module 162 is applied. The metadata key filter module 162 may either be classified as a white list (defined by the filter configuration 164 (where only keys in this list are included) or a black list (where matching keys are discarded)). In an aspect, the MEN system 10 can filter based on the entire key name (key-names filter) or the first set of characters in a key name (key-prefixes filter). The metadata key filter module 162 is useful for including or removing a set of key names. For example, creating a whitelist/filter configuration file 164 for image/jpeg with the key-prefixes filter "GPS", will include all of the GPS related key names (GPS Latitude, GPS Longitude, GPS Altitude, etc.). Another embodiment of the MEN system 10 allows for other partial key name matches, such as allowing wildcards or regular expressions in the key name filter. In another aspect, the MEN system 10 can define reserved key names 58 for its own internal operation that, if encountered, shall be discarded or renamed.

The user may construct a filter configuration file 164 comprised of lists of specific metadata that he wishes to include or exclude. For example, if the user desires to ensure that all GPS related metadata is included as metatags in the object store repository 30, he may define a whitelist/filter configuration file 164 that contains a key-prefix for "GPS". Similarly, if the user wishes to exclude all EXIF data from images, he may create a blacklist/filter configuration file 164 for the key-prefix "EXIF".

As with the friendly name list 58, after the user has created the filter configuration file 164, the user may either enter the file 164 directly into the system through CLI commands or create a specially formatted file to import a large list of mapping rules at one time. In some embodiments of the MEN system 10, the user can use a web interface to set up and import the mapping list.

In addition to the metadata 50 extracted from the file 40, the MEN system 10 allows for users to supply its own metadata 50 in the form of user defined metadata key=value pairs or metatags that are associated with all objects 40 passed to the object store repository 30. These user defined metatags 50*b* may be used to associate system information with the objects 40 (such as the version of the system that processed the object or the location the system processed the object) or other user defined information that the operator wishes to associate with all of the files 40 processed by the MEN system 10.

After the metatagging is completed, the MEN application 116 can call upon the metadata size enforcing module 170 which trims the normalized metadata dictionary 53 according to configured size constraints 60. The length restrictions can be defined by the object store repository and/or HTTP header restrictions. The metadata size enforcing module 170 can call on parameters size parameters 60 to ensure the length restrictions. These parameters 60 may be provided by the MEN system 10 or supplied by the user. Further, in some embodiments of the present invention, the MEN system 10 must be configured to operate within the limitations of the object store repository 30. For example, the object store repository 30 may only accept metadata with ASCII strings for keys 54*a* and values 54*b*. Characters outside of this range must be omitted or represented with a placeholder ACSCII character, such as "?". For example, when image file types 42 are transferred, other binary data (such as thumbnail images) may not be associated with the file 40 using the object store's metatag capabilities. The object store repository 30 may also limit the length of each metatag key names 54*a* associated with an object 40. For example, the friendly key names 58*a* may be limited to 128 characters. In such instances, the MEN system 10, via the metadata size enforcing module 170 may be configured to handle extracted keys with key names longer than this limit by omission or truncation to conform to the character limit. Similarly, the metatag value may be limited by the object store repository 30. For example, the length of each metatag (combined friendly name 58*a* and value 54*b*) may be limited at 255 characters. Metadata keys with values longer than this limit will be omitted or truncated based on the configuration of the MEN system 10 and carried out by the metadata size enforcing module 170.

In another embodiment, the size constraints 60 can include both key/value pair counts and total size of the normalized metadata dictionary 53, due to limitations of the object store repository 30 on the number of metatags that may be associated with each object 40. For example, the object store repository 30 may limit each object 40 to a maximum of 90 metatags. However, the number of metatags per object 40 varies significantly between content types. For example, jpeg image files frequently contain over 100 extractible metadata key=value pairs. As such, the MEN system 10 allows configuration of the maximum number of metatags that shall be associated with any specific object in the object store repository 30. Further, the MEN system 10 may limit total size of all metadata 50 per object 40. This may be required due to either or both HTTP (Hypertext Transfer Protocol) limitations as well as object store repository limitations. In such instances, the MEN system 10 may be configured to omit or truncate keys as needed to obey this limit. Any key names or values exceeding these restrictions are discarded and logged. The MEN system 10 reserves space for any configured system keys and reserved keys for operation. The MEN system 10, via the metadata size enforcing module 170, first trims to the maximum allowed pair count and then discard key/value pairs until the maximum allowable size is not exceeded. The determination of which key/value pairs to remove will give mapped friendly keys 58 and whitelist keys (from the filter configuration file 164) priority. Only after all non-friendly keys are discarded are the friendly keys considered for removal.

Prior to queuing the metatags to be transferred with the objects 40 to the storage repository through an Object Storage API 112, the MEN system 10 may (optionally) encrypt the metadata. Different embodiments allow for encrypting either or both of the metadata keys and values using any number of encryption ciphers 108. Whether or not the metadata is encrypted, a final metadata dictionary 62 is created from the normalized metadata dictionary 53.

The configured system key/values and final metadata dictionary 62 must be incorporated into the cloud object representation 45 (the in-memory object collection 126) prior to uploading to the object store repository 30 using the object storage API 112. Any previously associated metadata state 50 in the in-memory object 45 is purged and the final metadata dictionary 62 is written into the object 45. At this point, the in-memory object 45 is synchronized to the object store repository 30 by selecting a cloud talker from the thread pool 130 and transferring the object 45 using the selected the appropriate API from the Object storage API 112 for the selected object store 30.

Any errors detected during the sync discipline 142 are logged and the sync 142 is retried until a successful indication is received from the object store repository 30 that the file 40 and metadata/final metadata dictionary 62 have been accepted.

While the system is configured to assign metatags 62 to the object files 40 themselves, the raw extracted metadata 50 may be passed directly to the object store repository 30 as metadata tags 62 using the appropriate API from the object storage API 112.

In an aspect, the MEN system 10 can allow for metadata information 50 that cannot be associated directly with the object 40 as a metatag 62 to be stored as a separate object 40 in the object store repository 30 and referenced using a metatag that is directly associated with the object. For example, certain object storage repositories 30 do not allow non-ASCII information such as thumbnail images to be included as metadata. Under this circumstance, the MEN system 10 shall create a separate object 40 for the thumbnail and reference the location of the thumbnail object 40 in the original object metadata 50. In this embodiment, the extracted key name (or friendly name 58*a* as described above) will contain a location reference for the metadata content object. In this aspect, the metadata normalization module 116*b* is fed a friendly key list 58 to indicate which metadata key values 54 to store as objects 40 in the object store 30. When matching keys are found during the scan, the values of the keys are stored as files 40 in persistent storage 106 and the value 54*b* of the key 58 is replaced with the location of the value file/object. When a matching metadata key is found in the condensed dictionary 53, the metadata value file 40 is transferred in addition to the original file 40 to the object store repository 30 via the object storage API 112. This method may be employed to circumvent any of the object storage constraints described above.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A computing device comprises:
a network adapter;
object cache;
persistent local memory; and
one or more processing units operably coupled to the network adapter, the object cache, and the local memory, wherein the one or more processing units are operable to process a file transfer request from a file system to an object store repository by:
  obtaining the file transfer request regarding a file, wherein the file transfer request is in accordance with one of a plurality of file transfer methods;
  determine at least one configuration option regarding the file based on information of an object store repository;
  when the at least one configuration option indicates metadata formatting:
    process the file to generate extracted metadata for the file in an initial dictionary form, wherein the extracted metadata for the file includes a key name;
    process the extracted metadata and a content type of the file to determine whether to replace the key name for the file with a friendly key name for the file;
    when it is determined to replace the key name for the file with a friendly key name for the file:
      alter the extracted metadata based on a modified metadata dictionary of friendly names to produce altered metadata that includes the friendly key name for the file and that is applicable across a plurality of content types of files stored in the object store repository;
      filter the altered metadata based on a filter configuration file to produce filtered metadata; and
      output the file and the filtered metadata to the object store repository in accordance with a file transfer method of the object store repository.

2. The computing device of claim 1 further comprises:
when the at least one configuration option further includes encryption, the one or more processing units is further operable to encrypt the filtered metadata prior to outputting.

3. The computing device of claim 1 further comprises:
when the at least one configuration option further includes local storage, storing the file in the local memory.

4. The computing device of claim 1, wherein the one or more processing units is further operable to generate extracted metadata for the file by at least one of:
extracting metadata from the file; and
receiving the metadata from an external source.

5. The computing device of claim 1, wherein the file further comprises an object.

6. The computing device of claim 1, wherein the one or more processing units is further operable to generate the modified metadata dictionary.

7. The computing device of claim 1, wherein the one or more processing units is further operable to generate the filter configuration file to include a first list of metadata key names that are whitelisted and a second list of metadata key names are blacklisted.

* * * * *